United States Patent [19]
Siegmund

[11] 3,890,127
[45] June 17, 1975

[54] OPTICAL FIBER DRAWING APPARATUS

[75] Inventor: Walter P. Siegmund, Woodstock, Conn.

[73] Assignee: American Optical Corporation, Southbridge, Mass.

[22] Filed: June 6, 1974

[21] Appl. No.: 477,138

Related U.S. Application Data

[62] Division of Ser. No. 364,785, May 29, 1973, Pat. No. 3,837,824.

[52] U.S. Cl. .......................... 65/12; 65/13; 65/157
[51] Int. Cl.[2] ..................................... C03B 25/90
[58] Field of Search ............ 65/DIG. 7, 157, 13, 32, 65/12

[56] References Cited
UNITED STATES PATENTS

| | | | |
|---|---|---|---|
| 1,771,055 | 7/1930 | Pender | 65/157 X |
| 2,958,899 | 11/1960 | Stein et al. | 65/157 X |
| 3,395,006 | 7/1968 | Hopkins et al. | 65/157 X |
| 3,410,672 | 11/1968 | Delajarte | 65/157 X |
| 3,660,062 | 5/1972 | Keller | 65/DIG. 7 |
| 3,788,827 | 1/1974 | Deluca | 65/DIG. 7 |
| 3,791,172 | 4/1974 | Domenico | 65/12 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

Heating and drawing bundles of optical fibers under superatmospheric pressure to avoid the formation of gas bubbles therewithin and blemishing caused by their inclusions in components drawn from the bundle. Apparatus is provided within which heating and drawing of the bundle of optical fibers is accomplished in a pressure chamber while the component being drawn therefrom is continuously removed from the chamber through a fluid sealed gland.

5 Claims, 2 Drawing Figures

OPTICAL FIBER DRAWING APPARATUS

This is a division of application Ser. No. 364,785 filed May 29, 1973, now U.S. Pat. No. 3,837,824, issued Sept. 24, 1974.

BACKGROUND OF THE INVENTION

1. Field of the Invention

Fiber optics with particular reference to apparatus for manufacturing fused and drawn multiple fiber components.

2. Description of the Prior Art

Optical multifibers and long lengths of fused multiple fiber conduit are customarily formed by directing a bundle of juxtapositioned optical fibers longitudinally into a heating zone wherewith one end of the bundle is heated to a temperature conducive to drawing and the bundle is drawn longitudinally from its heated end to a predetermined desired cross-sectional size which is controlled according to the temperature and drawing rate applied to the heated end of the bundle. Simultaneously with the drawing, the bundle is gradually fed longitudinally into the heating zone at a rate corresponding to the rate of removal of material by drawing.

While this procedure offers the advantage of continuous drawing of large supplies of optical multifiber or multiple fiber conduit it, nevertheless, is attended by a problem of blemishing of the drawn multiple fiber product by the formation, growth and entrappment of gas bubbles in the heated, conically shaped drawing end or drawing cone of the supply bundle. These gas bubbles become carried through the drawing cone into the drawn multifiber component and indent adjacent fibers sometimes to the extent of completely cutting off their light-conducting cores. The affected fibers thus become poorly conductive to light and, in the worst case, non-conductive. Furthermore, light reaching blemishes caused by entrapped gas bubbles tends to become deflected laterally into other adjacent fibers as stray light which degrades optical images intended to be transmitted mosaically by the drawn multifiber component in applications of its use.

Extraneous matter such as dust and grease in bundles of fibers being drawn tend to produce gases at fiber drawing temperatures and absorbed and adsorbed gases in the bundle materials become released, all such gases tending to grow into the heat softened fiber materials as bubbles when the bundles are heated and drawn at atmospheric pressure and/or in evacuated environments. This growth of gas bubbles and their entrappment as inclusions in continuously drawn lengths of multifiber or fused multiple fiber conduit is overcome by the present invention and it is a principle object of the invention to provide apparatus and method for the manufacture of drawn optical multifiber or fused multiple fiber conduit of improved optical quality. The multifiber product is drawn under superatmospheric pressure with a minimum of encumberance of apparatus components and with complete accessability to the drawn product for monitoring during its production.

SUMMARY OF THE INVENTION

The foregoing objective and its corollaries are accomplished through the provision of a pressure chamber within which an elongated bundle of optical light-conducting fibers may be supported and moved longitudinally toward one end of the chamber into and through a heating annulus therewithin for bringing the bundle to a temperature conducive to drawing. Opposite ends of the pressure chamber are fitted with caps having glands through which a fiber bundle supporting rod and a drawn section of the bundle respectively may be mechanically moved by apparatuses externally of the pressure chamber. The gland receiving the section drawn from the bundle is uniquely sealed against leakage of fluid used to pressurize the chamber.

Details of the invention will become apparent from the following description when taken in conjunction with the accompanying drawing.

IN THE DRAWING

FIG. 1 is a diagrammatic illustration, in cross-section, of a preferred embodiment of apparatus for producing drawn multiple fiber components according to the invention; and FIG. 2 is an enlarged view, in perspective, of a portion of a drawn multiple fiber component.

DESCRIPTION OF THE PREFERRED EMBODIMENTS

Figures 1, 2:
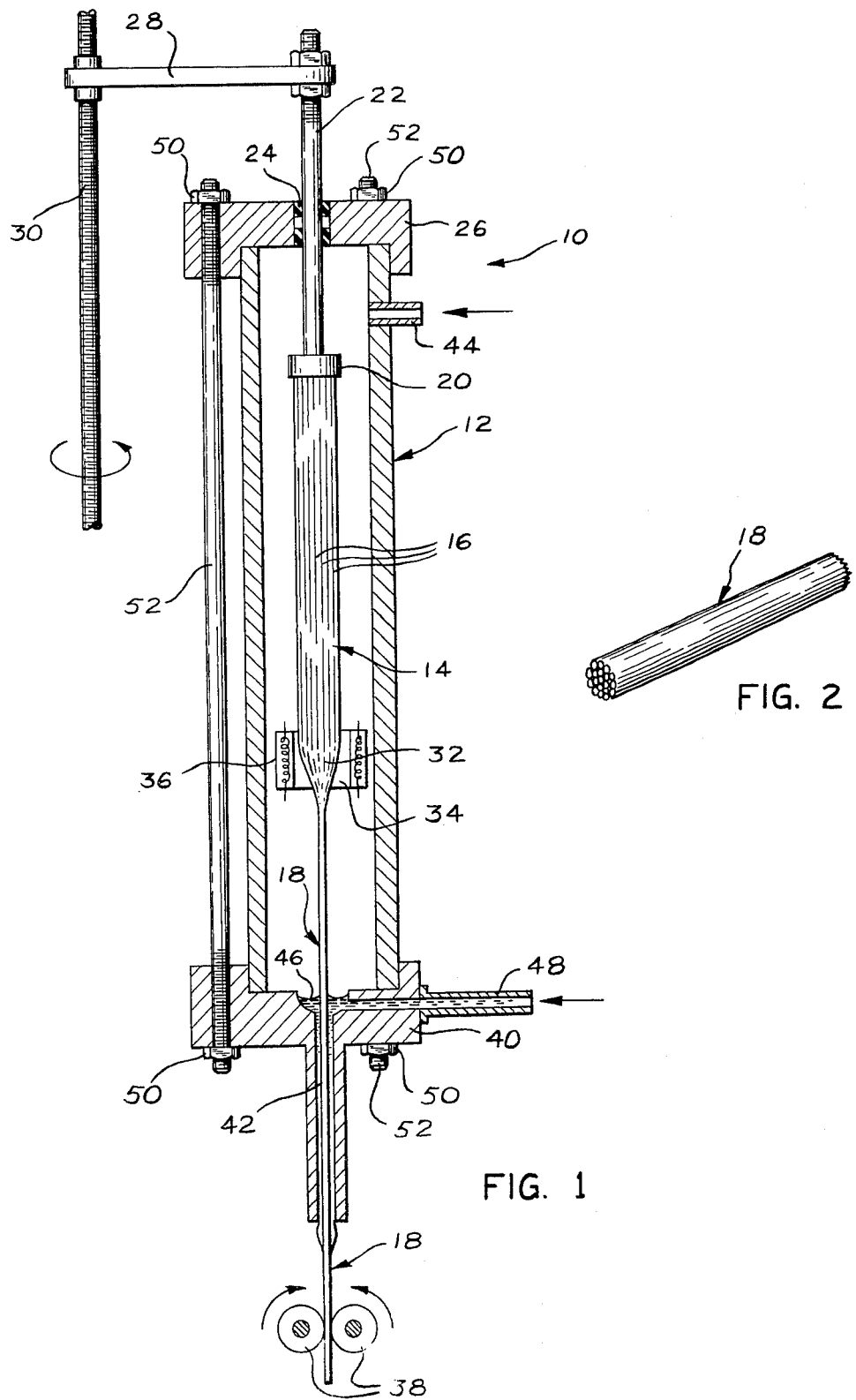

Apparatus 10 for heating and drawing bundles of optical fibers according to the present invention includes a tubular pressure chamber 12 of heavy steel or an equivalent material within which a bundle 14 of optical fibers 16 may be suspended for heating and drawing into a multifiber or fused multiple fiber component 18, an enlarged segment of which is illustrated in FIG. 2. The term "multifiber" is used in this case to refer to fused multiple fiber units which are long, thin and flexible and the broader expression "multiple fiber component(s)" is intended to further include multiple fiber units which are rigid.

Optical fibers 16 may each comprise a monofilament of high refractive index light-conducting material, e.g., a flint glass, coated with a relatively thin layer of a lower refractive index material such as crown or soda lime glass or, alternatively, each fiber 16 may comprise a prefused unit of monofilaments similar to or of the exact form of multiple fiber component 18 (FIG. 2). Optical fibers 16, whether of the monofilament or multiple fiber type may be of any preselected cross-sectional shape such as circular, square or hexagonal and of any desired cross-sectional size, all intimately juxtapositioned in bundle 16 generally as illustrated in FIG. 1. Those interested in greater details of the construction, function and general use of optical fibers of the monofilament and multiple fiber type may refer to U.S. Pat. Nos. 2,992,516; 2,980,957; and 3,037,241.

In the presently illustrated embodiment of the invention, bundle 14 of fibers 16 is suspended in chamber 12 by rod 22 extending from cap 20 upwardly through gland 24 in cover 26 of the chamber. While permitting axially directed movement of rod 22 in cover 26, gland 24 forms a fluid-tight seal between rod 22 and cover 26 preventing leakage of fluids introduced into chamber 12 under pressure. Gland 24 may comprise one or more O-ring gaskets or other suitable packing materials conventionally used for such purposes.

Rod 22 is attached to arm 28 which is operated by a power driven lead screw 30 used to selectively raise or lower bundle 14 in chamber 12. The arrangement of rod 22, arm 28 and lead screw 30 is shown diagrammatically for purposes of illustration only. Conventional apparatus of this type is contemplated for actual use.

An exemplary system is shown in U.S. Pat. No. 3,037,241.

The lowermost end 32 of bundle 14 is directed through heating zone 32 produced by an annular heating element 36, preferably electrically operated. By such means, end 32 of bundle 14 is heated to a temperature suitable for drawing a multiple fiber component 18 from the bundle with traction rollers 38 or other suitable means such as a winding drum or reciprocating clamps, the latter two being shown and described in the aforementioned U.S. Pat. No. 3,037,241.

According to this invention, the drawing apparatus, e.g. traction rollers 38, is positioned exterioraly of chamber 12 and the multiple fiber component 18 is extended outwardly of and away from chamber 12 so as to be readily accessable for monitoring during the drawing operation. In order to make it possible to locate the drawing apparatus, i.e. traction rollers 38, outwardly of chamber 12, its lower cover 40 is provided with fluid gland 42 which permits free passage of the multiple fiber component 18 therethrough while simultaneously sealing cover 40 against leakage of high pressure air or gases which may be introduced thereinto through inlet 44.

Fluid gland 42 includes a reservoir 46 in cap 40 which is continuously supplied through inlet 48 with a sealant such as, for example, a highly viscous sugar solution, waterglass solution or a viscous oil. Portions of the sealant carried through gland 42 by multiple fiber component 18 may be subsequently washed away or otherwise removed from the component 18 and recovered for reuse if the latter is deemed economically worthwhile.

The tubular orifice of gland 42 may be of a length of from approximately one inch to several inches and preferably about 0.010 to 0.030 inch larger in diameter than the outer diametral size of the drawn multiple fiber component 18 which is directed therethrough.

The selection of length and diametral size of the orifice of gland 42 would be made according to the pressure contemplated for use within chamber 12, which pressure may range between 1,000 lbs/in.$^2$ to 5,000 lbs/in.$^2$. For a given viscosity of sealant, the amount of clearance between a multifiber component 18 and walls of gland 42 and the length of the gland 42 orifice would be respectively smaller and longer for the higher pressures. In all cases, however, a supply of the liquid sealant is maintained in reservoir 46 during the drawing of component 18. The supply is fed through inlet 48.

The operation of drawing a multiple fiber component 18 would begin with preparation of the bundle 14 of fibers 16 by attaching rod 22 and cap 20 to one end thereof. With lower cover 40 removed from chamber 12, e.g., by removal of the lowermost clamping nuts 50 from tie rods 52, rod 22 and bundle 16 are inserted upwardly into chamber 12 through heating element 36 to the extent of causing rod 22 to pass through gland 24 for connection to arm 28. With rod 22 connected to arm 28 and the depending end of bundle 14 located within heating zone 34 of element 36, as controlled by operation of the lead screw 30, heating element 36 would then be activated to heat the adjacent end of the bundle 14 to a temperature conducive to drawing. The heated end of bundle 14 would then be baited and drawn downwardly into the multiple fiber component 18. Baiting may be performed by reaching upwardly into chamber 12 with tongs or a mechanical clamp or by extending a glass rod upwardly into contact with the heated end of bundle 14 causing fusion of the rod to the bundle. This would be followed by a downward pulling of the tongs or baiting rod sufficiently to form a substantial length of the component 18 whereupon the tongs would be released or the baiting rod broken away.

With a length of component 18 thus formed which is sufficient to permit cover 40 to be replaced, the drawing or baiting operation would be temporarily halted and cover 40 slipped over the component 18 upwardly against the lowermost end of chamber 12 as illustrated in FIG. 1.

With cover 40 bolted into place, e.g., by replacing nuts 50, the multiple fiber component 18 would be gripped by traction rollers 38, or other suitable means such as has been mentioned hereinabove, and a continuous drawing operation started. The selected fluid sealant would then be introduced into reservoir 46 and upon stabilization of the drawing operation (i.e. achieving a high degree of uniformity of size and shape of the multiple fiber component 18), pressure would be raised within chamber 12 by applying a suitable fluid such as compressed air or an inert gas under high pressure through inlet 44. The applied pressure, e.g., from 1000 lbs/in.$^2$ to 5000 lbs/in.$^2$, will prevent appreciable, if any, growth of gas bubbles within the heated portions of bundle 16 by preventing outgasing thereof.

A reduction or absence of gas bubble blemishing will become apparent from inspection of portions of the component 18 emerging from gland 42 following pressurization of chamber 12. When the portions of the multiple fiber component 18 of improved blemish quality reach traction rollers 38, the previously baited and drawn portions would be broken away and discarded.

The present invention features complete accessability of the drawn product for monitoring during its production with actual drawing taking place under superatmospheric pressure for improving product quality by minimization, if not elimination, of gas bubble formation, growth and blemishing. Furthermore, pressure chamber 12 and its associated components are readily adaptable to auxiliary use in conventional optical monofilament, multifiber or other multiple fiber drawing apparatuses with a minimum of encumberance of the latter apparatuses.

I claim:

1. Apparatus for drawing a fused multiple fiber component comprising:

a hollow chamber within which an elongated bundle of light-conducting fibers may be suspended for heating and drawing into the fused multiple fiber component, said chamber having normally closed opposite ends at least one of which may be selectively opened for receiving a bundle of light-conducting fibers to be heated and drawn within said chamber;

heating means within said chamber;

a removable cover forming the closure for one end of said chamber;

a liquid gland in said cover, said liquid gland including an elongated orifice into which a multiple fiber component drawn from said bundle may be directed and extended outwardly of said chamber when said cover is in place on said chamber, said orifice being of a diametral size greater than that of a component to be drawn from said bundle, and said gland further including an inlet to said orifice from externally of said chamber through which a liquid sealant may be introduced into said orifice peripherally about a multiple fiber component being drawn therethrough for sealing said orifice against leakage of gas directed into said chamber under pressure; and said chamber having inlet means for receiving and directing gas under pressure into said chamber.

2. Apparatus according to claim 1 further including reservoir means in said cover normally disposed inwardly of said chamber when said cover is in place thereupon, said orifice and reservoir and inlet in said cover being intercommunicated for passage of said liquid sealant therethrough, the function of said reservoir being to assure an even supply of said sealant to said orifice.

3. Apparatus according to claim 1 wherein a second removable cover forms the closure of the end of said chamber opposite to said one end, said second cover having a second gland therewithin and a rod extending through said gland for supporting a bundle of light-conducting fibers in said chamber.

4. Apparatus according to claim 3 further including means externally of said chamber for selectively moving said rod longitudinally in said chamber.

5. Apparatus according to claim 1 further including means externally of said hollow chamber for drawing said multiple fiber component through said liquid gland means.

* * * * *